(12) United States Patent
Shah et al.

(10) Patent No.: US 12,375,572 B2
(45) Date of Patent: Jul. 29, 2025

(54) SIMILARITY LEARNING-BASED DEVICE ATTRIBUTION

(71) Applicant: Target Brands, Inc., Minneapolis, MN (US)

(72) Inventors: Shalin S. Shah, Sunnyvale, CA (US); Nicholas Scott Eggert, Inver Grove Heights, MN (US); Ramasubbu Venkatesh, San Jose, CA (US)

(73) Assignee: Target Brands, Inc., Minneapolis, MN (US)

( * ) Notice: Subject to any disclaimer, the term of this patent is extended or adjusted under 35 U.S.C. 154(b) by 1047 days.

(21) Appl. No.: 17/352,678

(22) Filed: Jun. 21, 2021

(65) Prior Publication Data

US 2021/0312312 A1    Oct. 7, 2021

Related U.S. Application Data

(63) Continuation of application No. 15/814,167, filed on Nov. 15, 2017, now Pat. No. 11,042,810.

(51) Int. Cl.

| | |
|---|---|
| H04L 67/30 | (2022.01) |
| G06F 17/18 | (2006.01) |
| G06N 7/01 | (2023.01) |
| G06N 20/00 | (2019.01) |
| H04L 67/146 | (2022.01) |
| H04L 67/306 | (2022.01) |
| H04L 67/50 | (2022.01) |
| H04L 67/53 | (2022.01) |

(52) U.S. Cl.
CPC ............ *H04L 67/306* (2013.01); *G06F 17/18* (2013.01); *G06N 7/01* (2023.01); *G06N 20/00* (2019.01); *H04L 67/146* (2013.01); *H04L 67/53* (2022.05); *H04L 67/535* (2022.05)

(58) Field of Classification Search
CPC ............ H04L 63/0421; H04L 167/306; H04L 167/53; H04L 167/535; H04L 167/146; G06N 20/00; G06N 7/01; G06F 17/18; G06Q 30/0269
See application file for complete search history.

(56) References Cited

U.S. PATENT DOCUMENTS 7,039,239 B2    5/2006    Loui et al.
8,438,184 B1    5/2013    Wang et al.
(Continued)

OTHER PUBLICATIONS

Roberto Diaz-Moralesl—Cross-Device Tracking: Matching Devices and Cookies—(IDI Department, Treelogic), Dated 2015, 6 Pages.
(Continued)

*Primary Examiner* — Scott C Anderson
(74) *Attorney, Agent, or Firm* — Merchant & Gould P.C.

(57) ABSTRACT

Methods and systems for attributing browsing activity from two or more different network-connected devices to a single user are disclosed. In one aspect, cookies generated by the browsing activity of different unidentified devices at a website are received. A random forest classifier trained on probabilities output from a Gaussian mixture model is applied to the unidentified cookies to determine a probability that two different cookies were generated by the same user. In some embodiments, personalized content is then delivered to the user based on the characteristics of the paired cookies.

8 Claims, 19 Drawing Sheets

(56) References Cited

U.S. PATENT DOCUMENTS

| | | | |
|---|---|---|---|
| 8,655,695 B1* | 2/2014 | Qu | G06Q 30/0251 |
| | | | 705/7.29 |
| 10,037,417 B1 | 7/2018 | Modarresi | |
| 2010/0228625 A1 | 9/2010 | Priyadarshan et al. | |
| 2013/0097246 A1* | 4/2013 | Zifroni | H04W 4/029 |
| | | | 709/204 |
| 2013/0124309 A1 | 5/2013 | Traasdahl et al. | |
| 2016/0110343 A1* | 4/2016 | Kumar Rangarajan Sridhar | |
| | | | G06F 40/216 |
| | | | 704/9 |
| 2016/0182657 A1 | 6/2016 | Mukherjee et al. | |
| 2016/0189205 A1* | 6/2016 | Chittilappilly | G06Q 30/0246 |
| | | | 705/14.45 |
| 2016/0241645 A1* | 8/2016 | Sabbaghian | G06Q 30/0265 |
| 2017/0185904 A1* | 6/2017 | Padmanabhan | G06N 5/04 |
| 2019/0273789 A1 | 9/2019 | Modarresi | |

OTHER PUBLICATIONS

Fathi-Kazerooni et al., "Tracking user application activity by using machine learning techniques on network traffic." In 2019 International Conference on Artificial Intelligence in Information and Communication (ICAIIC) (pp. 405-410). IEEE. Feb. 2019.

\* cited by examiner

| Cookie | Cluster | Score |
|---|---|---|
| 5 | 3 | 0.799 |
| 2 | 3 | 0.56 |
| 1 | 1 | 0.555 |
| 3 | 2 | 0.51 |
| 1 | 3 | 0.29 |
| 4 | 2 | 0.24 |
| 1 | 2 | 0.232 |
| 3 | 3 | 0.19 |
| 4 | 1 | 0.132 |
| 2 | 1 | 0.1 |
| 5 | 2 | 0.089 |
| 4 | 3 | 0.08 |
| 3 | 1 | 0.045 |
| 5 | 1 | 0.045 |
| 2 | 2 | 0.003 |

| Cookie Precision | Pair Precision | Total Number of Cookie Pairs | Probability Cutoff Used |
|---|---|---|---|
| 79% | 84% | 220,336 | 0.8 |
| 72% | 76% | 1,286,170 | 0.75 |
| 58% | 54% | 6,944,854 | 0.7 |
| 37% | 24% | 38,059,037 | 0.65 |
| 24% | 8% | 156,714,249 | 0.6 |
| 11% | 2% | 589,920,761 | 0.5 |

| Probability Cutoff | Precision | Correlation between actual and predicted age |
|---|---|---|
| 0.5 | 11% | 0.19 |
| 0.55 | 16% | 0.26 |
| 0.6 | 21% | 0.35 |
| 0.65 | 26% | 0.4 |
| 0.7 | 38% | 0.48 |
| 0.75 | 55% | 0.6 |
| 0.8 | 65% | 0.67 |
| 0.85 | 71% | 0.7 |
| 0.9 | 76% | 0.75 |
| 0.95 | 78% | 0.77 |

SIMILARITY LEARNING-BASED DEVICE ATTRIBUTION

CROSS-REFERENCE TO RELATED APPLICATIONS

This application claims the benefit of U.S. patent application Ser. No. 15/814,167, filed Nov. 15, 2017, now U.S. Pat. No. 11,042,810, issued Jun. 22, 2021, entitled, "SIMILARITY LEARNING-BASED DEVICE ATTRIBUTION." The disclosure of this priority application is hereby incorporated by reference in its entirety into the present application.

TECHNICAL FIELD

The present disclosure relates generally to attributing browsing behaviors on a website across different network-connected devices to a single user.

BACKGROUND

Browsing activity of users can be tracked to determine the user's browsing habits and interests. By keeping track of browsing behavior, content providers of a website can present more customized content to the user. For example, if the website present items for sale, the website can utilize the browsing activity of users to provide personalized recommendations of new items for the user to consider buying.

Cookies and other methods of tracking browsing behavior are helpful for determining the interests of a user. However, cookies are specific to a particular device, and do not necessarily uniquely identify the user to the website. Furthermore, because users often use a mix of devices in browsing content, the user's browsing activities on a first device cannot readily be attributed to the user when that same user is browsing on a second device. Accordingly, there may be a deficiency in the content provider's ability to provide such personalized recommendations to the user.

SUMMARY

In summary, the present disclosure relates to methods and systems for attributing browser activity on a website from two or more devices with the same user. In example aspects, machine learning is utilized to analyze cookies received from multiple devices that have browsed a website. The cookies' characteristics are used to assess the probability that two or more cookies received from two or more different devices can be attributed to the same user that was browsing a particular website. Various aspects are described in this disclosure, which include, but are not limited to, the following aspects.

In one aspect, a method of attributing browsing activity from two or more network-connected devices to a single user is provided. A plurality of unidentified cookies are received at a computing system, each having a plurality of characteristics. The unidentified cookies are generated from browsing activity of a plurality of different unidentified devices at a website. A random forest classifier is applied to the plurality of unidentified cookies to determine a probability of at least one first cookie received from a first device being generated from a common user with at least one second cookie received from a second device different from the first device. The random forest classifier is trained on probabilities output from a Gaussian mixture model. The first and second cookies are attributed to the common user. Then personalized content is delivered to the common user based on the plurality of characteristics of the first and second cookies.

In some embodiments, the random forest classifier is trained by receiving a plurality of identified cookies at the computing system. The identified cookies are generated from activity of a plurality of different identified devices at the website and each cookie has a plurality of characteristics. At least one pair of cookies associated with browsing activity of a known user is identified. The pair of cookies includes a first training cookie received from a first known device and a second training cookie received from a second known device. Characteristics common to the pair of cookies are identified. A Gaussian mixture model is trained on the identified characteristics to generate clusters of cookies. Scores are generated for the probability that each cookie belongs to each cluster. Then the random forest model is trained on the scores and the characteristics.

In another aspect, a system for attributing browser behavior from two or more devices to the same user includes a web server and a computing device. The web server is configured to host a website and store cookies recorded from the browsing activity of one or more users on one or more network-connected devices. The computing device includes a processor and a memory communicatively coupled to the processor. The memory stores instructions executable by the processor to receive cookies from the web server and score the cookies in pairs with a random forest classifier to calculate a probability that the cookies in each pair were produced by the browsing activity of the same user.

In yet another aspect, a non-transitory computer-readable storage medium comprising computer-executable instructions is disclosed which, when executed by a computing system, cause the computing system to perform a method of attributing web browsing activity from multiple devices to a single user. Cookies produced by browsing activity of known users on known network-connected devices are received at a computing system. Cookies from two of the known network-connected devices attributed to the same known user are paired. Characteristics common to the paired cookies are identified. The cookies are clustered at the computing system based on the identified characteristics. A probability is calculated for each cookie and cluster for each device type and user. A random forest classifier is trained. A plurality of unidentified cookies are received from two or more different unidentified devices at the computing system. The unidentified cookies are scored with the trained random forest classifier by calculating a probability that pairs of the unidentified cookies are attributable to the same user. The cookies pairs are then filtered and the remaining cookie pairs are output as being attributable to the same user. Then personalized content is delivered to the user based on the characteristics of the cookie pairs.

This summary is provided to introduce a selection of concepts in a simplified form that are further described below in the Detailed Description. This summary is not intended to identify key features or essential features of the claimed subject matter, nor is it intended to be used to limit the scope of the claimed subject matter.

BRIEF DESCRIPTION OF THE DRAWINGS

FIG. 14 illustrates how selection of different threshold probabilities can affect precision;

FIG. 15 illustrates a method of inferring latent similarities between cookies and users;

DETAILED DESCRIPTION

Figure 1:
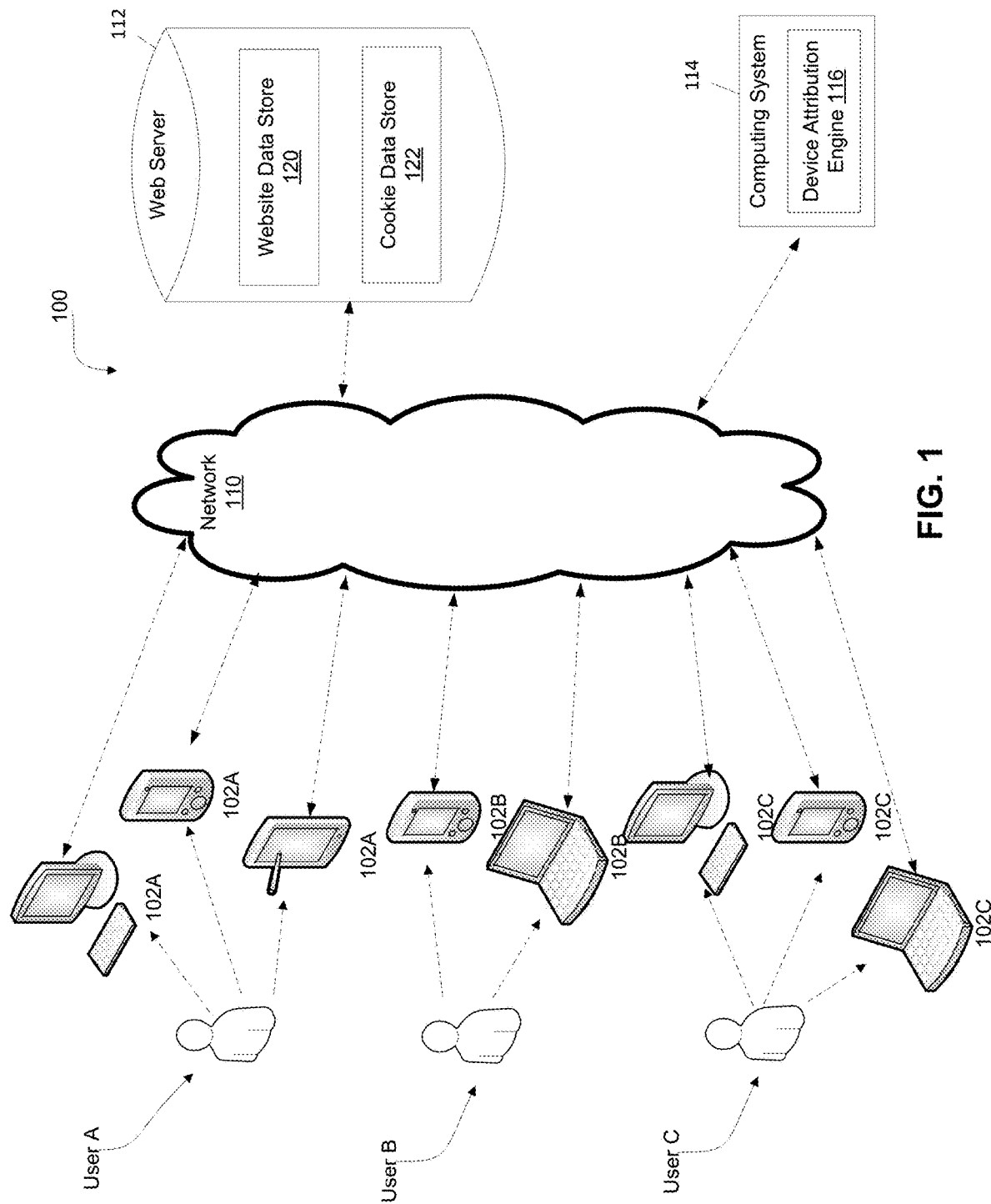
FIG. 1 illustrates a diagram of an example network and system for attributing browser activity from multiple different devices to the same user.

Various embodiments will be described in detail with reference to the drawings, wherein like reference numerals represent like parts and assemblies throughout the several views. Reference to various embodiments does not limit the scope of the claims attached hereto. Additionally, any examples set forth in this specification are not intended to be limiting and merely set forth some of the many possible embodiments for the appended claims.

Similarity learning is a machine learning technique that compares pairs of items and the goal is to learn a function that outputs a similarity between the two items. The similarity output needs to be an interpretable number, such as between 0 and 1. Learning to compare items is useful in many applications, like cross device cookie matching, image comparisons, distance between two audio files, similarity between two text documents, and so on. In the following disclosure, similarity learning is applied to the problem of determining the probability that two cookies belong to the same user, where, for example, the two cookies may be generated from browsing activities of two different devices.

Cookies (also known as HTTP cookies, web cookies, Internet cookies, or browser cookies) are small pieces of data sent from a website and stored on a user's computer by the user's web browser. One of the functions of cookies is to record a user's browsing activity on the Internet—in particular relating to a particular website. Such browsing activity includes clicking particular buttons or links, logging in, recording past pages visited on the browser, or inputting information into form fields. Cookies are often utilized to determine a user's preferences for particular internet content, such as shopping for particular items. User preferences are useful for making product recommendations on shopping websites or targeting advertisements to a user's tastes.

While cookies are useful for learning about a user's interests and browsing behavior, they do not provide the whole picture regarding the identity of that user. Unless a user is logged into an account linking two devices together, cookies cannot be tracked across multiple devices. A user may browse for content on a desktop computer, then continue to browse similar content on a mobile device. Separate sets of cookies are produced by those two browsing sessions because they occur on separate devices. The goal of the current disclosure is to provide a method and system for linking the cookies produced from browsing on two different devices and attributing those cookies to the same user. This will produce a more complete picture of that user's preferences and overall browsing behavior, thereby enhancing the process of learning a user's interests. This allows for more personalized content to be presented to a user on a website.

If some data about a user is available, such as logging in onto one device, machine learning can link the browsing activity of the user from other devices. The method described in this disclosure uses a Gaussian mixture model combined with a random forest classifier to connect the activity of a user on one device with another. Anonymous characteristics of the cookies are discovered and quantified. Aspects of the user's activity such as number of page views, items viewed in similar categories, similar items viewed, similar visit times of day, and overlapping sessions are used to identify pairs of cookies. No personally identifiable information is used.

The characteristics of known cookies are used to generate clusters of cookies with a Gaussian Mixture Model. The model produces probabilities that are then input into a random forest classifier for training. The random forest classifier calculates the probability that a pair of cookies that includes one cookie from a first device and a second cookie from a second device comes from the activity of the same user.

Referring first to FIG. 1, a diagram of an example system 100 for attributing browsing activity on different devices to a single user is illustrated. In the example shown, a plurality of network-connected devices 102 are shown, each being associated with a particular user. For example, devices 102A are associated with User A, devices 102B are associated with User B, and devices 102C are associated with User C. The devices 102 are capable of connecting to a network, such as the network 110 shown in FIG. 1. The network 110 can be any of a variety of types of public or private communications networks, such as the Internet. The devices include desktop computers, laptop computers, tablet computing devices, smartphones, and other devices capable of connecting to the Internet through wireless or wired connections.

The devices 102 connect to a web server 112 and a computing system 114. The web server 112 functions to provide a website accessible through the network 110 by the one or more devices 102. In some examples the website is a retail website that allows the users to view information about items for sale and to make purchases. In the embodiment shown, the web server 112 includes a website data store 120 and a cookie data store 122.

The website data store 120 includes information that is displayed when a user accesses the particular website associated with the web server 112. For example, User A could access the web server 112 through a tablet 102A via the network 110 to view the particular website hosted by the web server 112 on a web browser. Information such as images, videos, texts, and hyperlinks are stored in the website data store 120. Information is accessed from the website data store 120 and is displayed for the user on the web browser. In the context of the present disclosure, the web browser can be a general purpose web browser or a cookie-generating mobile application allowing a user to perform guest browsing (e.g., without providing a known user credential). For purposes of simplicity, each of these types of applications (applications capable of receiving cookies from a website without providing unique user credentials to that website) is referred to herein as web browsers or web browser applications.

The cookie data store 122 receives cookies sent from the user devices 102. The cookies record the user's activity on the website associated with the web server 112. The cookies have recorded characteristics that reflect the user's browsing activity and identity. For example, the characteristics can include one or more of the following: time of day of activity, date of activity, type of actions taken (e.g. clicking, typing in text, making selections, filling in forms, etc.), type of content viewed, items put in a shopping cart, items purchased, IP address, zip code of user location, number of pages or items viewed, etc. The cookies are stored in the cookie data store 122 to be later accessed by the computing system 114.

In the embodiment shown, the computing system 114 includes a device attribution engine 116. The device attribution engine 116 communicates with the web server 112 through the network 110 to access the cookies in the cookie data store 122. In example embodiments, the device attribution engine 116 performs an analysis of the cookies to determine if cookies from different devices can be attributed to the same user. Such an analysis allows for machine learning systems to more accurately track user browsing activity and provide personalized recommendations or content to a user that is browsing a website. The identity of the user does not need to be known to provide the personalized recommendations or content. Methods performed by the device attribution engine 116 are further described below.

Figure 2:
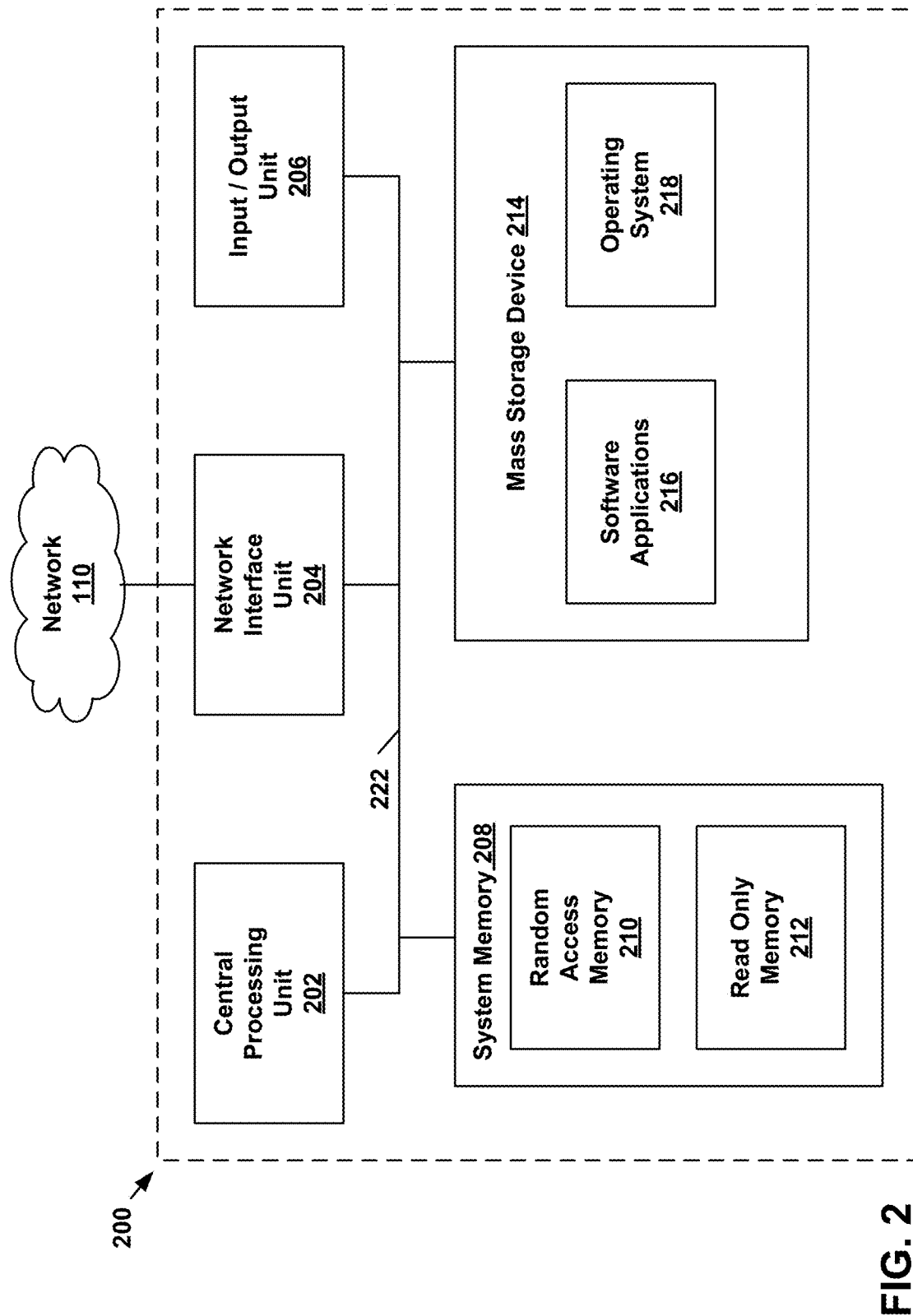
FIG. 2 illustrates an example block diagram of a computing system useable in the context of FIG. 1.

Referring now to FIG. 2, an example block diagram of a computing system 200 is shown that is useable to implement aspects of the system 100 of FIG. 1. The computing system 200 can be used to implement, for example, the computing systems 102 or 114 of FIG. 1, in example aspects.

In the embodiment shown, the computing system 200 includes at least one central processing unit ("CPU") 202, a system memory 208, and a system bus 222 that couples the system memory 208 to the CPU 202. The system memory 208 includes a random access memory ("RAM") 210 and a read-only memory ("ROM") 212. A basic input/output system that contains the basic routines that help to transfer information between elements within the computing system 114, such as during startup, is stored in the ROM 212. The computing system 200 further includes a mass storage device 214. The mass storage device 214 is able to store software instructions and data. In example applications the mass storage device 214 stores one or more software applications 216. Such software applications can depend on the context in which the computing system is used. For example, in the case of computing systems 102, the software applications 216 can include a web browser configured to receive cookies in response to browsing activities; the software applications 216 can also include a mobile application configured to receive cookie information, e.g., in the instance in which the mobile application allows anonymous browsing to occur. The software applications 216 can also (or alternatively) include one or more data analysis applications, such as are described below in connection with FIG. 3.

The mass storage device 214 is connected to the CPU 202 through a mass storage controller (not shown) connected to the system bus 222. The mass storage device 214 and its associated computer-readable storage media provide non-volatile, non-transitory data storage for the computing system 200. Although the description of computer-readable storage media contained herein refers to a mass storage device, such as a hard disk or solid state disk, it should be appreciated by those skilled in the art that computer-readable data storage media can include any available tangible, physical device or article of manufacture from which the CPU 202 can read data and/or instructions. In certain embodiments, the computer-readable storage media comprises entirely non-transitory media.

Computer-readable storage media include volatile and non-volatile, removable and non-removable media implemented in any method or technology for storage of information such as computer-readable software instructions, data structures, program modules or other data. Example types of computer-readable data storage media include, but are not limited to, RAM, ROM, EPROM, EEPROM, flash memory or other solid state memory technology, CD-ROMs, digital versatile discs ("DVDs"), other optical storage media, magnetic cassettes, magnetic tape, magnetic disk storage or other magnetic storage devices, or any other medium which can be used to store the desired information and which can be accessed by the computing system 200.

According to various embodiments of the invention, the computing system 200 may operate in a networked environment using logical connections to remote network devices through a network 110, such as a wireless network, the Internet, or another type of network. The computing system 200 may connect to the network 110 through a network interface unit 204 connected to the system bus 222. It should be appreciated that the network interface unit 204 may also be utilized to connect to other types of networks and remote computing systems. The computing system 200 also includes an input/output controller 206 for receiving and processing input from a number of other devices, including a touch user interface display screen, or another type of input device. Similarly, the input/output controller 206 may provide output to a touch user interface display screen or other type of output device.

As mentioned briefly above, the mass storage device 214 and the RAM 210 of the computing system 200 can store software instructions and data. The software instructions include an operating system 218 suitable for controlling the operation of the computing system 200. The mass storage device 214 and/or the RAM 210 also store software instructions, that when executed by the CPU 202, cause the computing system 114 to provide the functionality of the computing system 200 discussed in this document. For example, the mass storage device 214 and/or the RAM 210 can store software instructions that, when executed by the CPU 202, cause the computing system 200 to receive and analyze transaction data.

Figure 3:
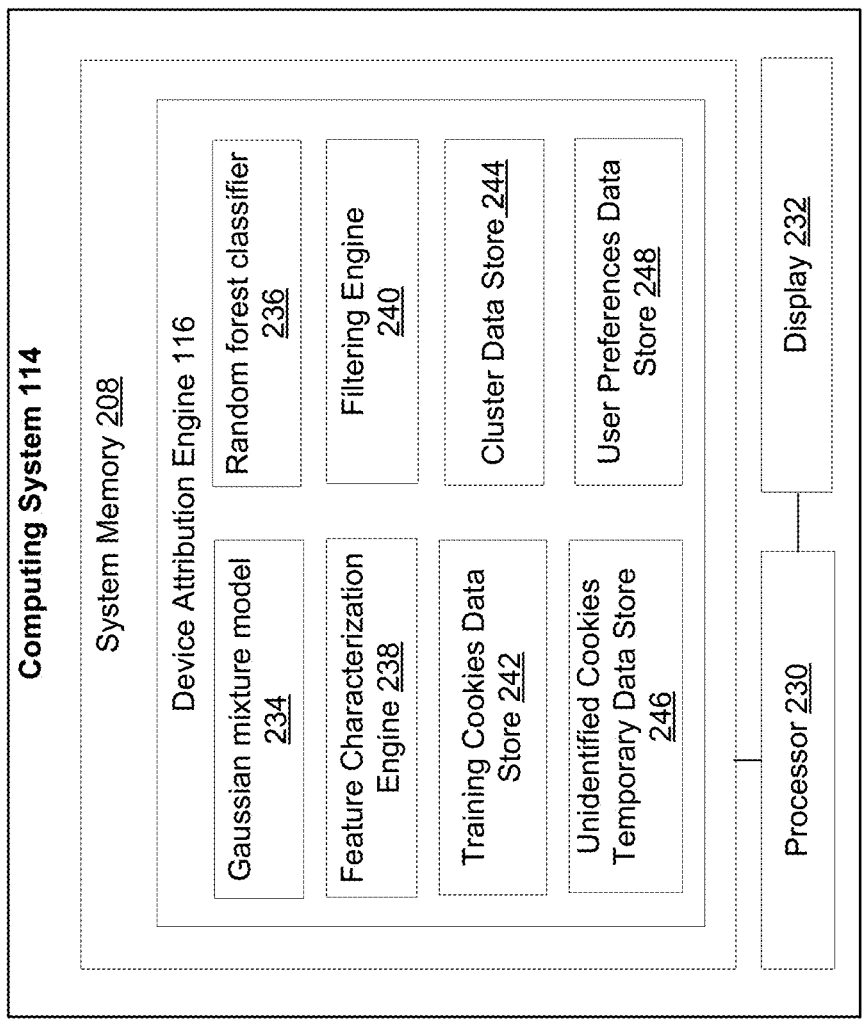
FIG. 3 illustrates a more detailed view of one example implementation of the computing system of FIGS. 1-2.

FIG. 3 illustrates a more detailed schematic diagram of the computing system 114 of FIG. 1. In the embodiment shown, the computing system 114 includes system memory 208, operatively connected to a processor 230. The computing system 250 also includes a display 232, also operatively connected to the processor 230 and system memory 208.

In the example embodiment shown, the system memory 208 includes a device attribution engine 116. The device attribution engine 116 includes a Gaussian mixture model 234, a random forest model 236, a feature characterization engine 238, a filtering engine 240, a training cookies data store 242, a cluster data store 244, an unidentified cookies temporary data store 246, and a user preferences data store 248. The various engines generally are implemented in software modules stored in the system memory 208, executable by the processor 230, and are implemented as discussed in further detail below.

The Gaussian mixture model 234 is configured to cluster cookies based on a standard expectation maximization algorithm. The Gaussian mixture model is trained on identified cookies generated from the browsing activity of known users on different devices. These cookies are stored in the training cookies data stores 242. In some embodiments, the Gaussian mixture model is trained with Apache Spark. The clusters are formed based on characteristics of the cookies identified by the feature characterization engine 238, described below. The number of clusters formed is determined by k, the number of components selected. In some embodiments, a user operating the computing system 114 determines the value of k. k is a value less than n, where n is the number of cookies that are being used to train the Gaussian mixture model. In some embodiments, 1000 clusters of cookies are formed. The Gaussian mixture model 234 then calculates a probability for each cookie for each cluster and each device type. For example, if there are 1000 clusters, and two types of devices, 2000 probabilities are output. Once the clusters and probabilities are determined, they are recorded and stored in the cluster data store 244. The function of the Gaussian mixture model is further described with respect to FIG. 9.

The random forest classifier 236 is configured to receive unidentified cookies from the unidentified cookies temporary data store 246 and determine the probability that a first cookie from a first device and a second cookie from a second device that is different from the first device are attributed to the browsing activity of a single user. This process is further described with respect to FIG. 11. For example, a given pair of cookies might include a first cookie from a laptop computer and a second cookie from a smartphone and the laptop computer and smartphone were used by the same user to browse the same website. The random forest model 236 is trained on the probabilities produced by the Gaussian mixture model 234, as described in FIG. 10.

The feature characterization engine 238 analyzes cookies to determine characteristics of the cookies. For example, the characteristics can include one or more of the following: time of day of activity, date of activity, type of actions taken (e.g. clicking, typing in text, making selections, filling in forms, etc.), type of content viewed, items put in a shopping cart, items purchased, IP address, zip code of user location, number of pages or items viewed, etc. In some aspects, the feature characterization engine 238 analyzes pairs of cookies to determine which characteristics are common to the two cookies. Characteristics identified by the feature characterization engine 238 are utilized by the Gaussian mixture model to produce clusters of cookies.

The filtering engine 240 filters pairs of cookies after probabilities are calculated for pairs by the random forest classifier 236. The filtering performed by the filtering engine 240 removes pairs of cookies coming from two different devices that are less likely to be attributable to the same user. For example, cookies that have zip codes and IP addresses indicating the browsing activity took place in a similar geographic area can be filtered and are considered to be more likely to be attributable to the same user. Also, pairs of cookies that have a probability of less than a preset threshold, e.g., 0.1, after being scored by the random forest classifier 236 can be eliminated because it is unlikely that the cookies came from devices that were used by the same user. Other methods of filtering are possible to increase the precision of the device attribution results, and various thresholds can be set for probabilities among cookies to tune results. In some embodiments, the filtering engine 240 is not present or is not always used to filter cookie pairs.

The training cookies data store 242 stores cookies collected from the web server 112 that have been identified and are known to be attributable to a particular user. Preferably, the cookies stored in the training cookies data store 242 include pairs of cookies that include a first cookie from browsing activity on a first device and a second cookie from browsing activity on a second device, where the second device is different from the first device and the first and second devices were used by the same user for browsing the website associated with the web server 112. The training cookies are used to train the Gaussian mixture model 234 and random forest classifier 236.

The cluster data store 244 stores information about clusters created by the Gaussian mixture model 234 based on the characteristics identified by the feature characterization engine 238 from the training cookies in the training cookies data store 242. The identified characteristics and corresponding cookie clusters are recorded in the cluster data store 244 to be accessed later by the random forest model 236 to determine the probabilities that two cookies are attributable to the browsing activity of the same user. This allows the training to accommodate different browsing behavior of a same user if that user has different activity (e.g., by browsing different types of content, performing different types of transactions, browsing at different times of day, locations, etc.) when browsing using different devices.

The unidentified cookies temporary data store 246 is used during the process of identifying cookie pairs for unidentified users. Unidentified cookies are received from the web server 112 as browsing activity takes place on the website associated with the web server 112. The cookies are stored in the unidentified cookies temporary data store 246 until they are analyzed by the random forest model 236. Once it has been determined which cookies can be paired based on similar browsing characteristics for a single user, the cookies can be deleted from the unidentified cookies temporary data store 246.

The user preferences data store 248 stores information about cookies that have been paired together to represent the browsing activity of a single user. In some embodiments, the user is identified by one or more cookies and then additional cookies are attributed to the user through pairing. In other embodiments, the cookies do not include any identifying information about the identity of the user. However, an anonymous user profile can be created based on paired cookies and the preferences of that user can be determined by examining the collective cookies. Information about the preferences of such identified or anonymous users is stored in the user preferences data store 248. This information can be later accessed by other software modules that will utilize the information to provide personalized content to the user in future browsing sessions on the website associated with the web server 112.

Figure 4:
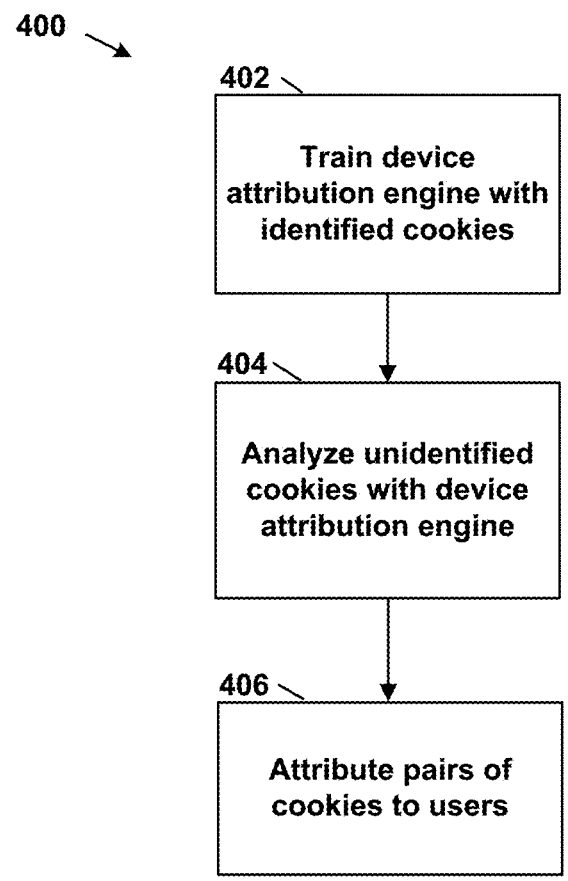
FIG. 4 illustrates an example method of attributing devices to a single user.

FIG. 4 illustrates an example method 400 of attributing browsing activity from two or more different devices to a single user. The method 400 provides an overview of how a computing system, such as the computing system 114 of FIG. 1 can be utilized to attribute cookies from multiple devices to the same user.

At operation 402, a device attribution engine is trained on identified cookies. One example method of training the device attribution engine is further described with respect to FIG. 5.

At operation 404, the device attribution engine is utilized to analyze unidentified cookies. One example method of analyzing cookies is further described with respect to FIG. 6.

At operation 406, cookies are attributed to users. One example method of attributing cookies to users is further described with respect to FIG. 7.

Figure 5:
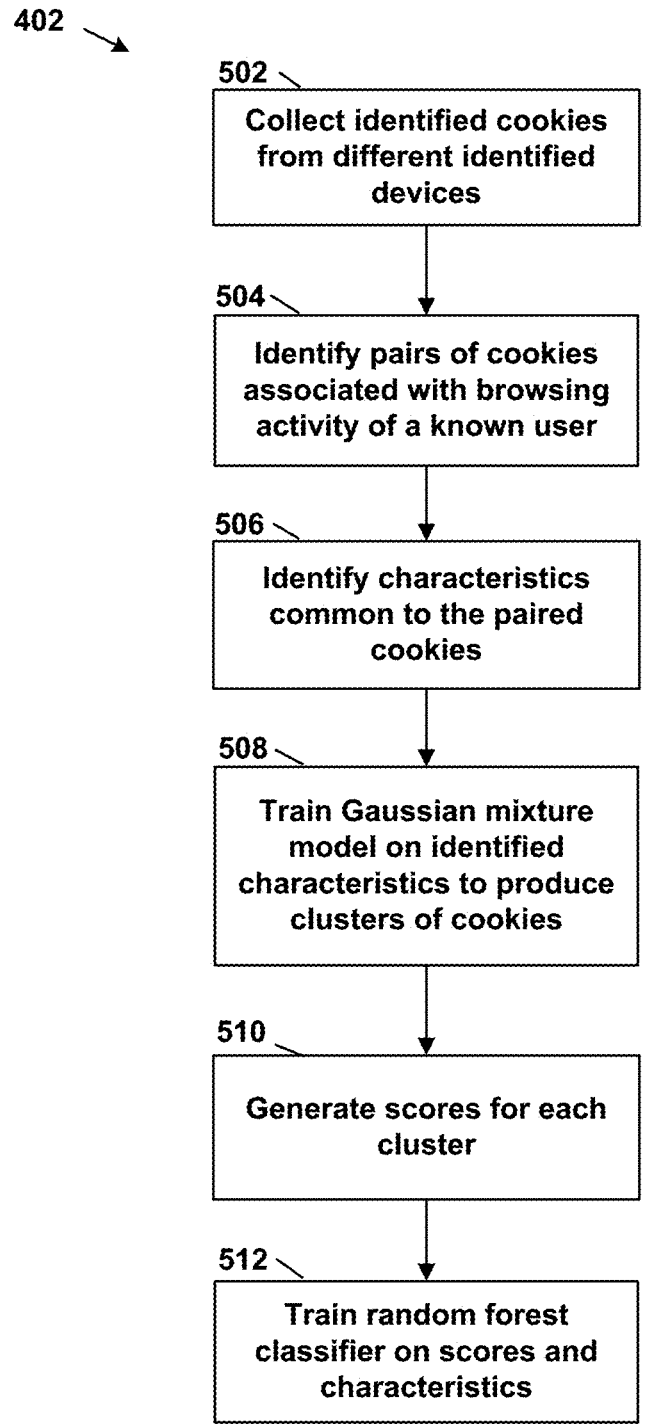
FIG. 5 illustrates an example method of training a device attribution engine on identified cookies.
Figure 8:
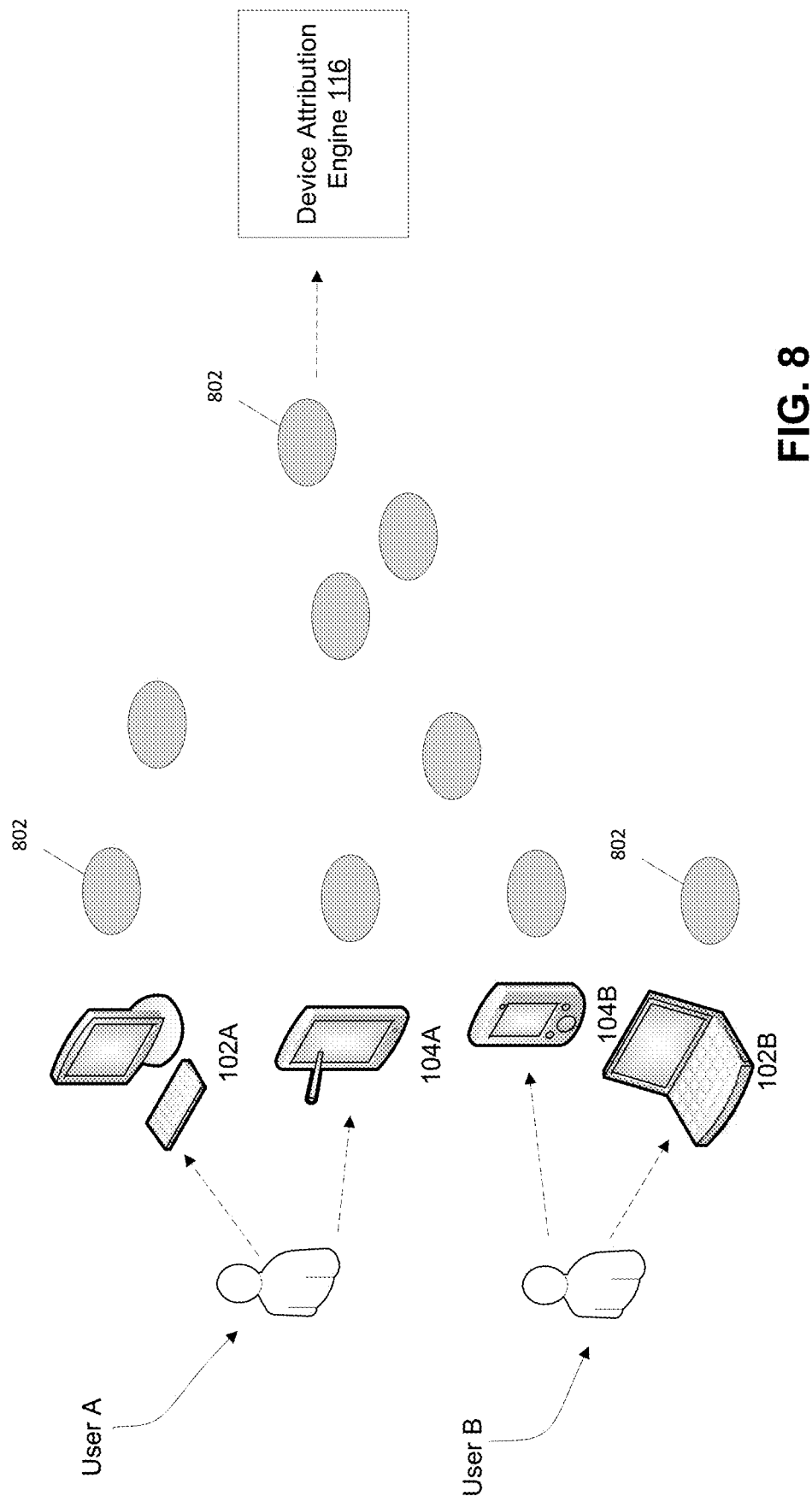
FIG. 8 illustrates an example embodiment of the method of FIG. 5.
Figure 9:
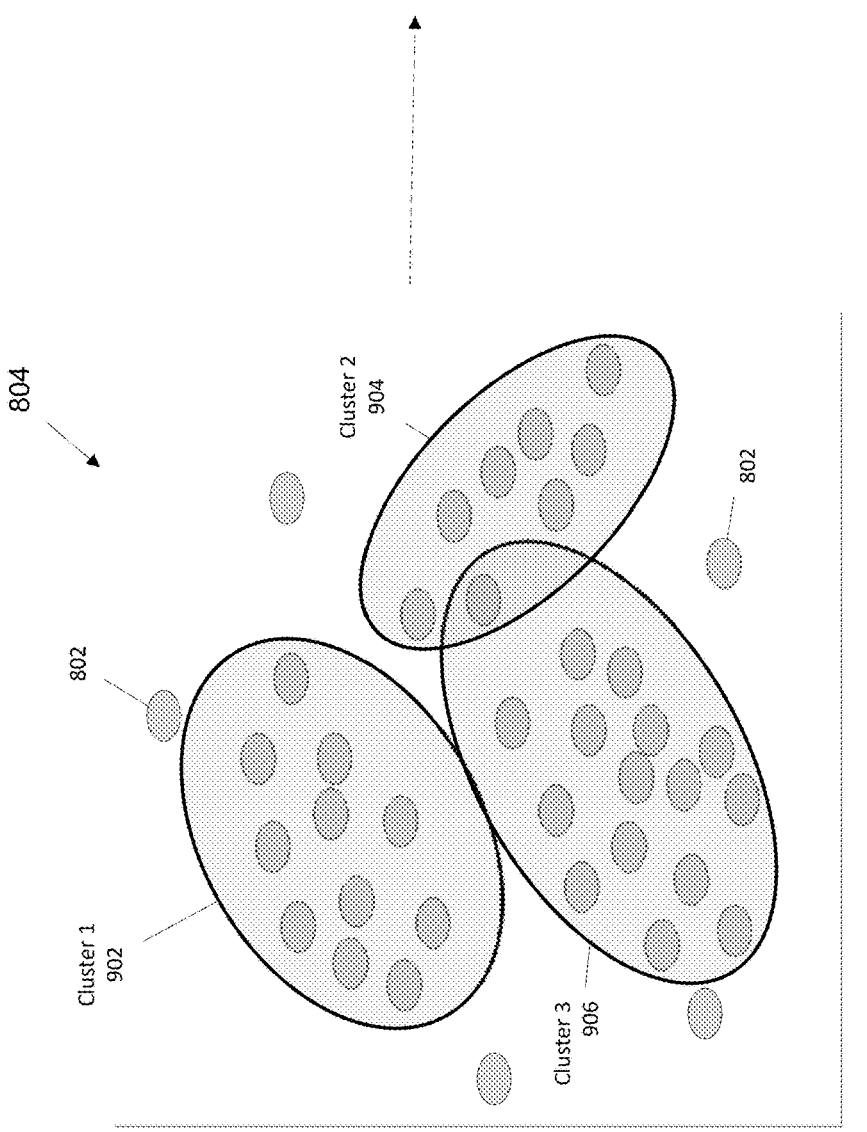
FIG. 9 illustrates an example embodiment of the method of FIG. 5.
Figure 10:
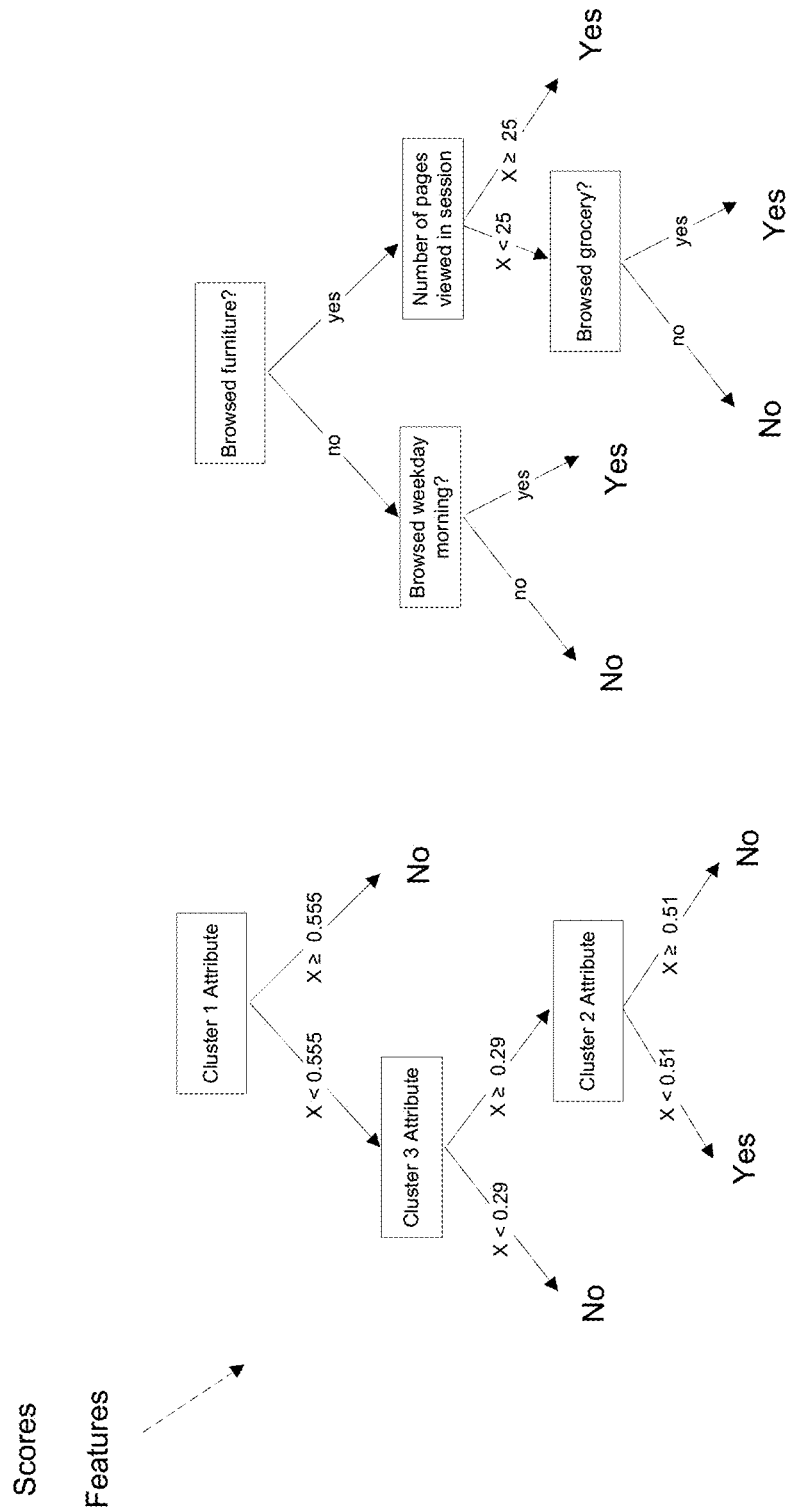
FIG. 10 illustrates an example embodiment of the method of FIG. 5.

FIG. 5 illustrates an example method 402 of training a device attribution engine. An example illustration of the method 402 is depicted in FIGS. 8-10. The random forest classifier is trained on existing cookies that have been identified from multiple devices that are attributable to the same user's browsing activity. The similarities found in the browsing activity of a user across two or more devices are used to calculate probabilities that two or more cookies from two or more devices came from the same user. By determining which browsing activity is attributable to a single user, a more complete profile of a user's preferences can be constructed for the purposes of marketing and personalization.

At operation 502, identified cookies from different identified devices are collected. In some examples, the cookies are collected at a web server such as the web server 112 of FIG. 1. The cookies are identified based on information identifying the user. Such information may be identifying information gathered from anonymous browsing activity. In some embodiments, the cookies are stored in the training cookies data store 242 of the device attribution engine 116. This is a simplified example. The method can be applied to hundreds, thousands, millions, or even billions of cookies generated by many different users and devices.

FIG. 8 illustrates an example embodiment of operation 502. In FIG. 8, two users, User A and User B, are shown as operating two devices. User A browses a website on a desktop computer 102A and a mobile device 104A. User B browses a website on a different desktop computer 104B and mobile device 102B. Browsing activity of the users on the devices generates cookies 802. The cookies 802 are collected at the device attribution engine 116.

At operation 504, pairs of cookies from the same user's browsing activity are identified. The pairs of cookies include a first cookie from a first device and a second cookie from a second device that is different from the first device. Web browsing activity that occurs on two or more separate devices that is attributable to the same user is identified by login information or other identifying information. Cookies produced by the browsing activity are paired between the devices based on the common user. For example, a cookie generated during browsing activity of a user on a desktop computer is paired with a cookie generated during browsing activity of the same user on a mobile device. In the example of FIG. 8, each user is browsing on both a desktop computer and a mobile device.

At operation 506, characteristics common to two paired cookies are identified and characterized. This operation may be performed in some embodiments by the feature characterization engine 238 of the computing system 114 of FIG. 3. Example features that may be used to compare and match cookies with users include behavioral features such as marketing channels, internet service providers, times of online activity, IP address, search keywords, number of page views, items viewed in similar categories, similar items viewed, and the like. In this example, no personally identifiable information is used.

In some embodiments, additional calculations are performed to produce features that are later used in the random forest classifier. In such embodiments, the following values are computed per cluster of cookies: the maximum and minimum of a first device type in a cluster; the maximum and minimum of a second device type in a cluster; a cosine similarity between the first device type and second device type probabilities in a cluster; the mean and median probability of first device type probabilities; the mean and median probability of second device type probabilities; the mean absolute difference between the first device type and second device type probabilities; the absolute difference between the maximum probability of first device type cookies and the minimum probability of second device type cookies in a cluster.

At operation 508, a Gaussian mixture model is trained on the characteristics identified in operation 506. Where n is the number of cookies and k is the number of clusters, k is less than n. The Gaussian mixture model is used to create k number of clusters of cookies. The clusters are formed based on similar characteristics of the cookies. Pairs of cookies within the same cluster are more likely to have been produced in the browsing activity of the same user. In the example shown in FIG. 9, the cookies 802 are formed into three clusters: Cluster 1 (902), Cluster 2 (904), and Cluster 3 (906). In some embodiments, more clusters are formed from a larger number of cookies.

At operation 510, a standard expectation maximization algorithm is utilized by the Gaussian mixture model to calculate scores. The scores are the probability that each cookie belongs to each cluster. k number of scores are calculated to match the k number of clusters. A score is also calculated for each device type. In some embodiments, the scores are on a scale of 0 to 1, as shown in the example of FIG. 9.

At operation 512, the probabilities or scores produced in operation 510 are input into a random forest classifier, such as the random forest classifier 236 of FIG. 3. The probabilities are used as features to train the random forest classifier. In addition to the probabilities generated for each device type and user, the characteristics for each cluster are also used as features, in some embodiments. For example the maximum and minimum probability of all probability vectors in a particular cluster can be used as a feature. In the example of FIG. 10, a random forest classifier is trained with attributes of the clusters as well as characteristics of the cookies. The random forest classifier is trained to determine when a first cookie from a first device comes from the browsing activity of the same user as a second cookie from a second device.

Once the device attribution engine 116 has trained the Gaussian mixture model 234 and random forest classifier 236 on identified cookies from the training cookies data store 242, it can be used to assess new pairs of unidentified cookies to determine if they are attributable to the same user. The random forest classifier can achieve 20% to 70% precision for probabilistically matching cookies to a user, depending on the application.

Figure 6:
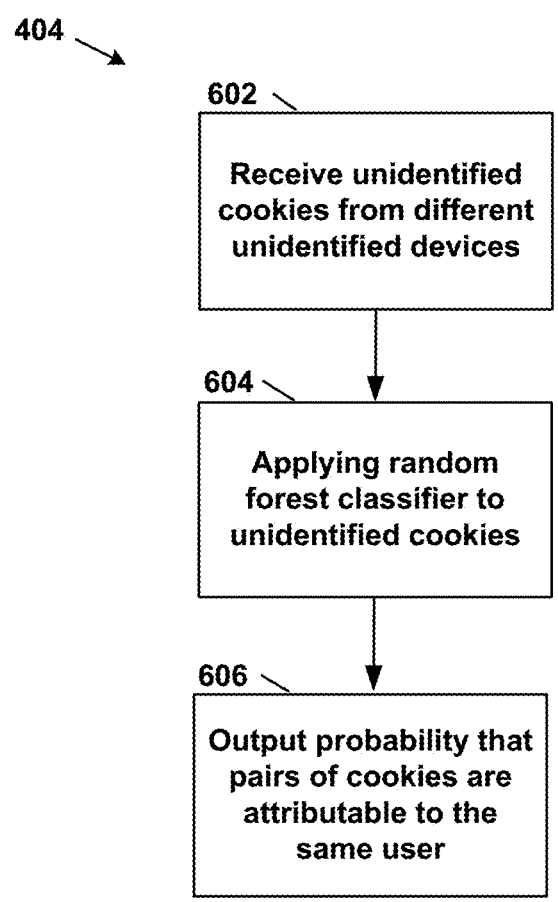
FIG. 6 illustrates an example method of analyzed unidentified cookies with a random forest classifier.
Figure 11:
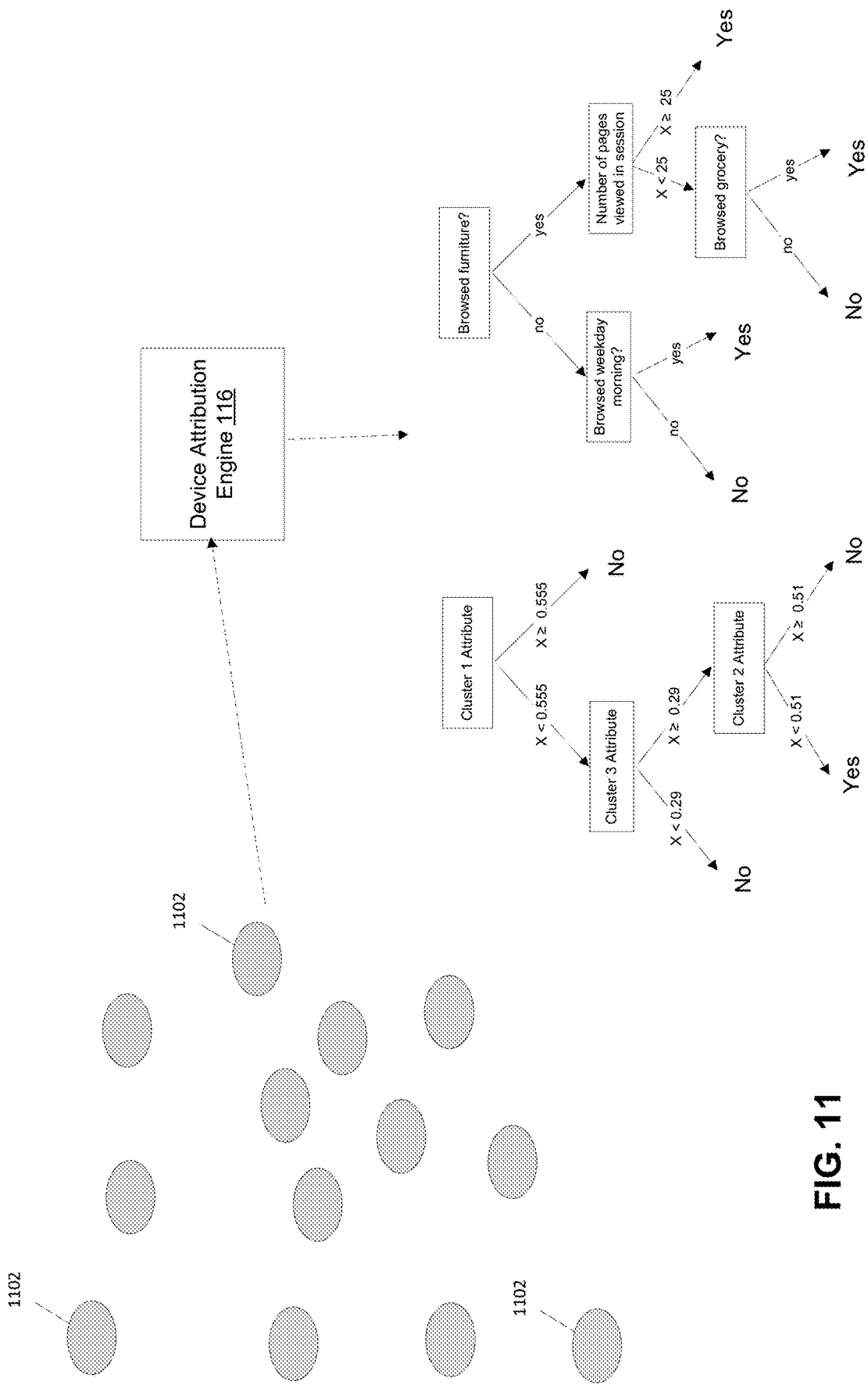
FIG. 11 illustrates an example embodiment of the method of FIG. 6.

FIG. 6 illustrates an example method 404 of analyzing unidentified cookies with a random forest classifier. In this example, the unidentified cookies are analyzed with the random forest classifier trained as described in the method 402 of FIG. 5. FIG. 11 illustrates an example of method 404.

At operation 602, unidentified cookies are received. In some embodiments, the cookies are collected at a web server 112 in a cookie data store 122, as described with respect to FIG. 1. In such embodiments, the unidentified cookies are communicated to a computing device 114 for storage in an unidentified cookies temporary data store 246. Unidentified cookies are cookies that are produced by browsing activity on a device without knowing the identity of the user. In the example of FIG. 11, unidentified cookies 1102 are collected at the device attribution engine 116. The device attribution engine 116 applies the unidentified cookies 1102 to the random forest classifier 236.

At operation 604, each possible pairing of unidentified cookies are scored using the random forest classifier 236. As shown in FIG. 11, decision trees are used to classify the cookies based on the cluster attributes and probabilities as well as the cookie characteristics.

Figure 12:
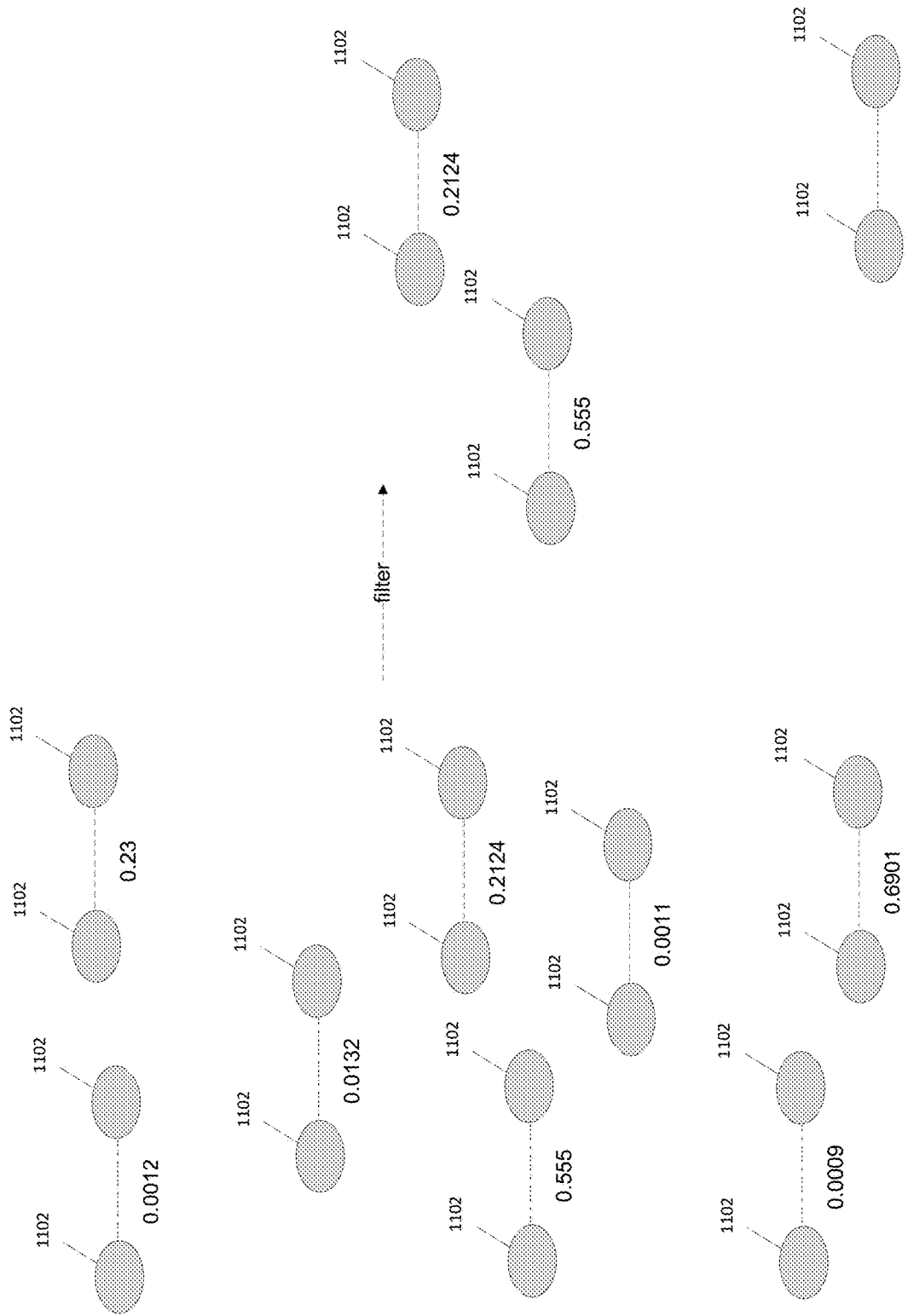
FIG. 12 illustrates an example embodiment of the method of FIG. 6.

At operation 606, the output from the random forest classifier is a probability that each pair of unidentified cookies are attributable to the same user's browsing activity. The probabilities are presented as a score of 0 to 1 or 0 to 100. An example of scores for pairs of cookies are shown in FIG. 12. A higher score indicates a higher probability that two cookies are attributable to the same user.

Figure 7:
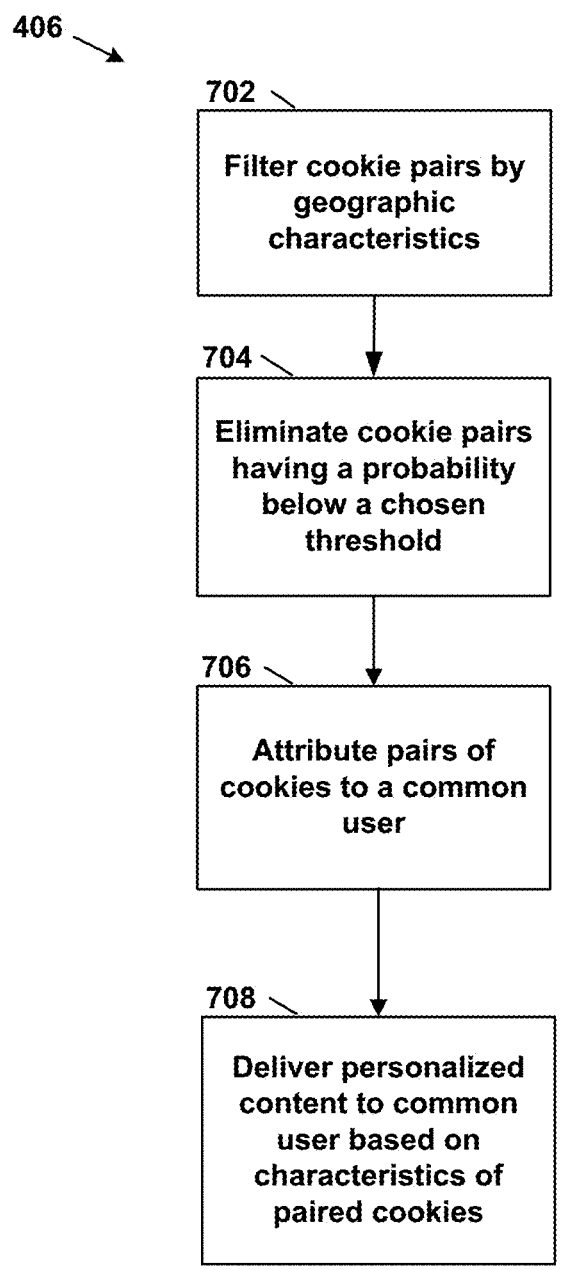
FIG. 7 illustrates an example method of attributing cookie pairs to a user.

After the cookie pairs are scored, pairs of cookies that are considered to be attributable to the same user are identified. An example method 406 of attributing cookie pairs to a user is illustrated in FIG. 7. In some embodiments, the cookie pairs are filtered to improve the precision of the pairing results. Additionally, a threshold is determined to select cookie pairs having at least a particular probability in order to select the pairs of cookies that will be considered to be attributable to the same user.

Figure 16:
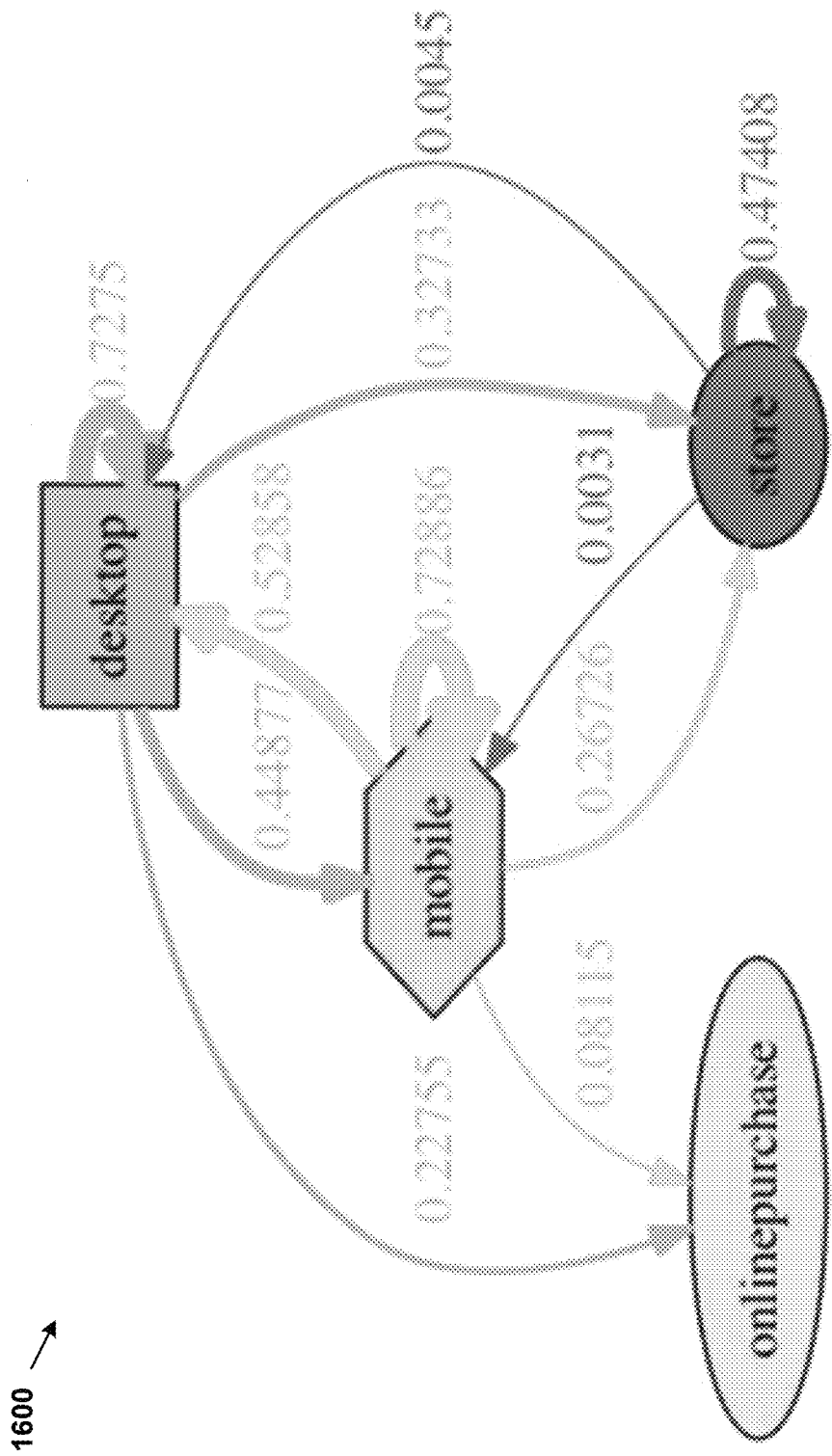
FIG. 16 illustrates a transition graph for desktop computing users, mobile device users, and stores purchases.

At operation 702, the cookie pairs are filtered by geographic characteristics such as zip code and IP address. If cookies within a pair are not from similar geographic regions, the cookie pair will be eliminated. In the example of FIG. 16, the cookie pairs are filtered to eliminate pairs of cookies that are less likely to be attributable to the same user. In this example, four of the eight pairs of cookies are eliminated by geographic characteristics.

Figure 13:
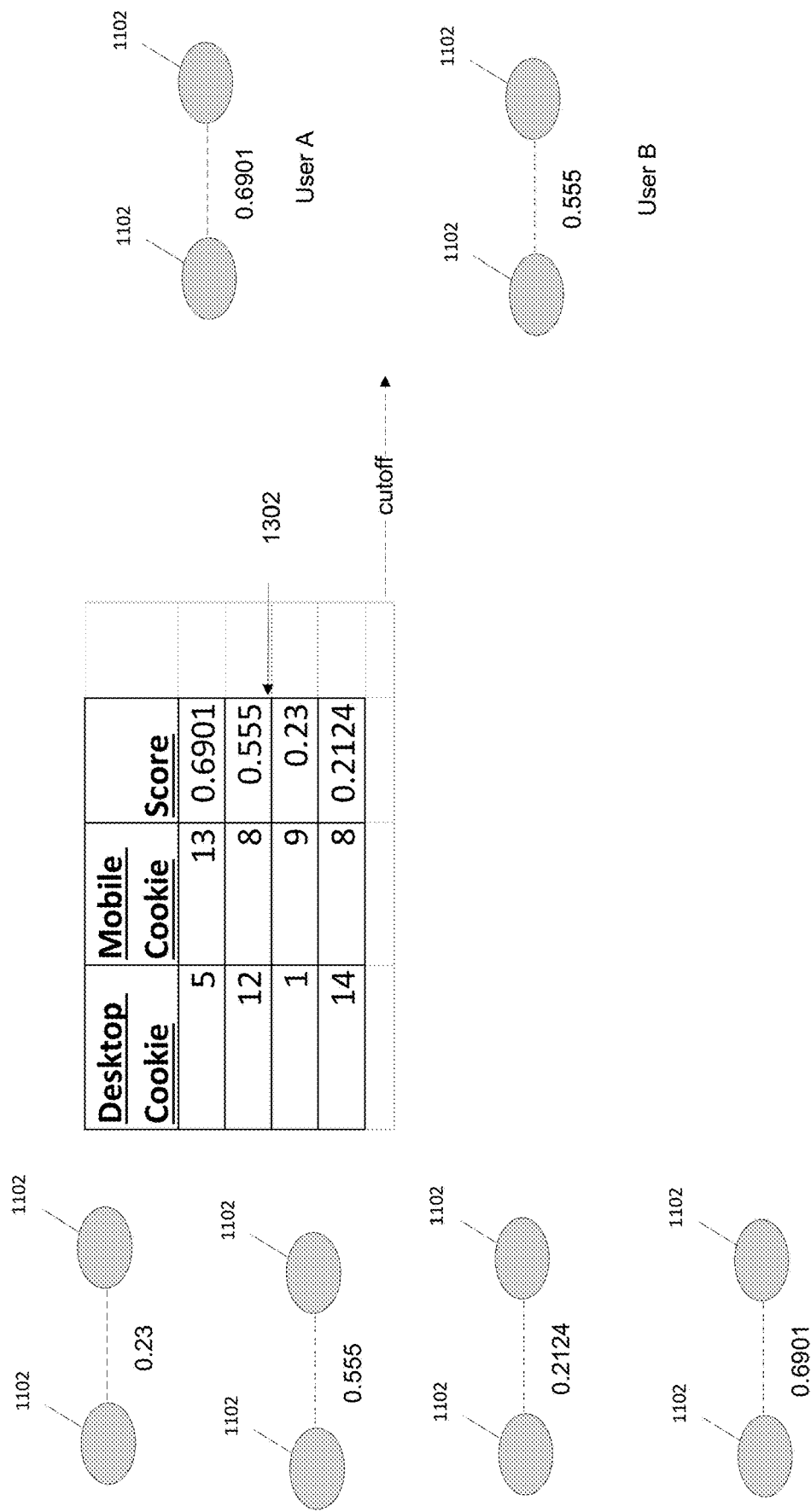
FIG. 13 illustrates an example embodiment of the method of FIG. 7.

At operation 704, the cookie pairs are filtered by probability score. The cookie pairs are ranked by their probability scores. A threshold is chosen to optimize the preferred precision of the cookie pairs. Any cookie pairs that fall below the threshold probability are eliminated. For example, in some embodiments pairs having a score of 0.1 or less are eliminated. In other embodiments a threshold of 0.5 may be chosen to increase the precision of the pairs. An example of operation 704 is illustrated in FIG. 13. Here, a probability threshold 1302 of 0.5 has been selected. This threshold eliminates two of the four cookie pairs.

At operation 708, the remaining pairs of cookies are attributed to users. In the example of FIG. 13, one pair of cookies is attributed to User A and the other pair of cookies is attributed to User B. In some embodiments, a first cookie is associated with a known user and a second cookie is unidentified. In such embodiments, when the second cookie is paired to the first cookie, the second cookie can be attributed to the known user. If neither cookie in a pair can be associated with a known user, a new profile is built to record the browsing activity of the unknown user. Subsequently gathered cookies meeting this new profile can then be used to develop an understanding of preferences of the user matching the new profile for personalization of delivered content.

The characteristics of the paired cookies are recorded in the user preferences data store 248. The characteristics are used to build user profiles based on their browsing activities on the website hosted by the web server 112. These user profiles can be utilized to generate personalized content for the user while browsing on the web server 112.

Additional details about the calculations and analysis of the method are provided below. Alternative models, algorithms, and calculations may be substituted to produce the probabilities.

FIG. 14 illustrates how selection of different threshold probabilities can affect the cookie precision and cookie pair precision. The table 1400 shows data for cookies collected over a given period of time from a particular website. The first column shows cookie precision, which is the number of corrected classified cookies divided by the total number of cookies retrieved at the probability cutoff. The second column shows pair precision, which is the number of correct cookie pairs divided by the total number of cookie pairs retrieved at the probability cutoff. The third column indicates the total number of cookie pairs that are retrieved at the probability cutoff. Finally, the fourth column indicates the probability cutoff used. As can be seen from the table, the higher the probability cutoff used, the higher the precision of the cookies and cookie pairs.

FIG. 15 illustrates how, by establishing user profiles according to browsing activity, the method of the present disclosure can be used to infer latent and subtle similarities between cookies and users. In this example, the method is used to predict the age of users of desktop computers by pairing cookies from the desktop computers with cookies of mobile devices that are being used by identified users (users whose age is known). The table 1500 shows the probability cutoff used in the first column and the resulting precision in the second column. The third column indicates the correlation between the actual and predicted ages of the users (R). As can be seen in the table, as the probability cutoff increases, as does the precision and the correlation. Even though the cookies do not record the ages of an unknown user, this table shows that a latent factor such as age can be inferred from pairing unknown cookies with those of known users. Other latent factors of users can be detected as well; the present disclosure is not limited to detection of age, but rather such a factor is intended as exemplary.

Referring now to FIGS. 16-19, an example application of the methods described above is discussed. The example described in FIGS. 16-19 is used to determine how web browsing on a retailer website affects the likelihood that a user will make a purchase in a store versus online. Cookies were collected from desktop computers and mobile devices over the period of one month. Purchases were recorded in a retail store associated with the retailer website as well as online purchases made through the retailer website. The following transition graphs of FIGS. 16-19 were constructed at a 0.7 probability cutoff and data was collected for one month.

The transition graphs can be read by considering the edge weights as percentages of users. For example, in FIG. 16, the transition graph 1600 shows that the edge from desktop to store has a weight of 0.327. This means that 32.7% of users visit the website on their desktop computer and during the same month, later go to the store to buy something. As the graphs show, the new cross device inferred users have stronger interactions between desktop and mobile, which is expected. What is surprising is that these newly identified users have a stronger store purchase behavior as compared to the original data.

Figure 17:
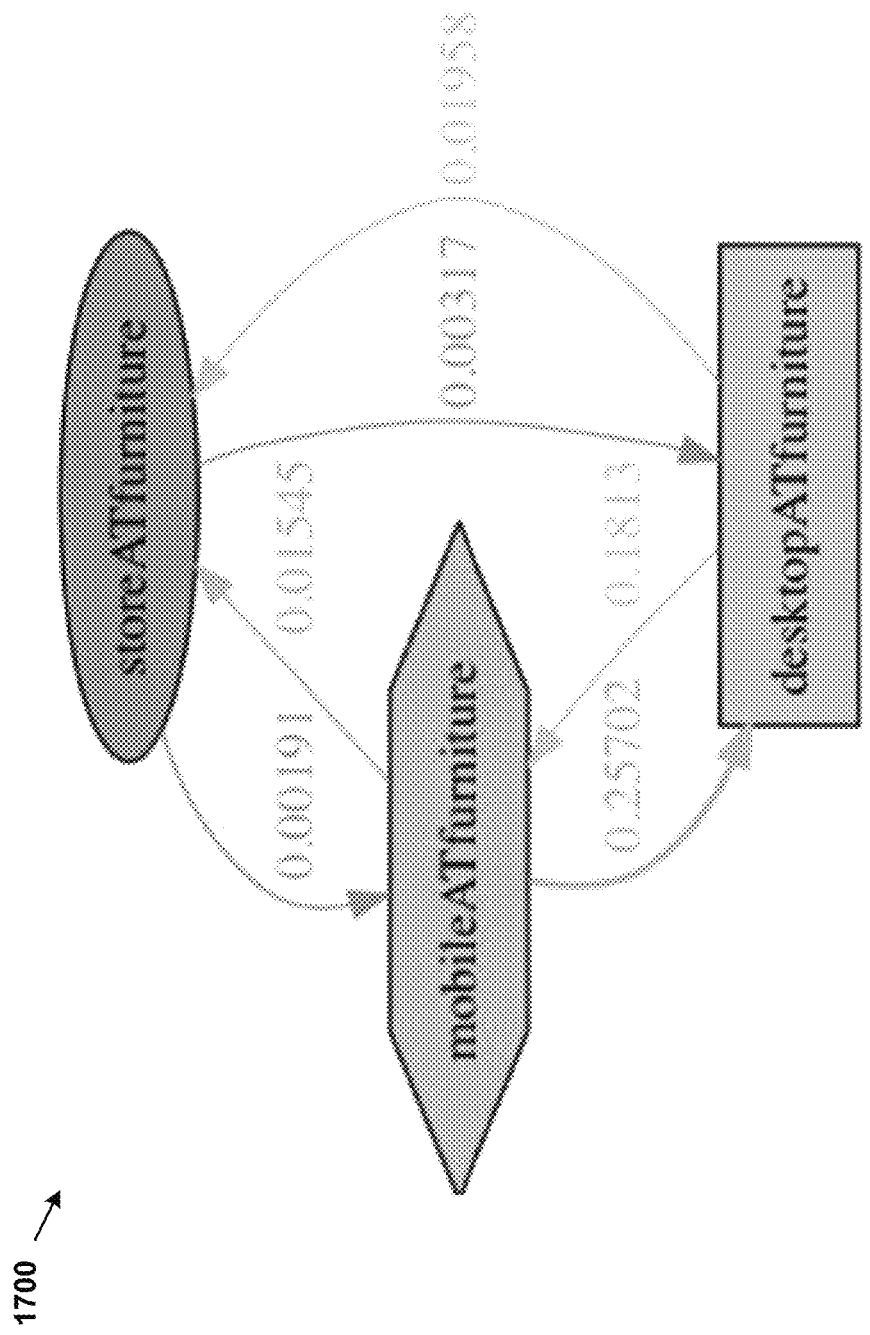
FIG. 17 illustrates a cross device transition graph for furniture products.
Figure 18:
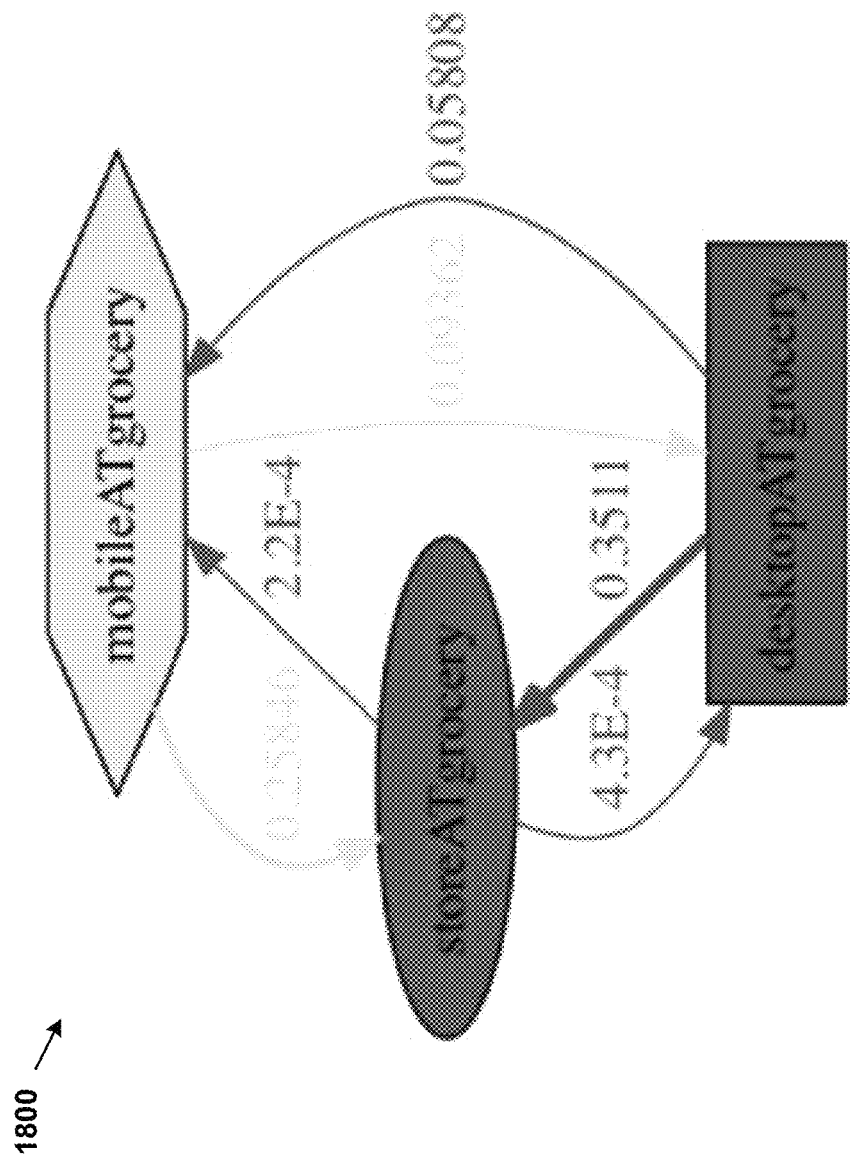
FIG. 18 illustrates a cross device transition graph for grocery products.
Figure 19:
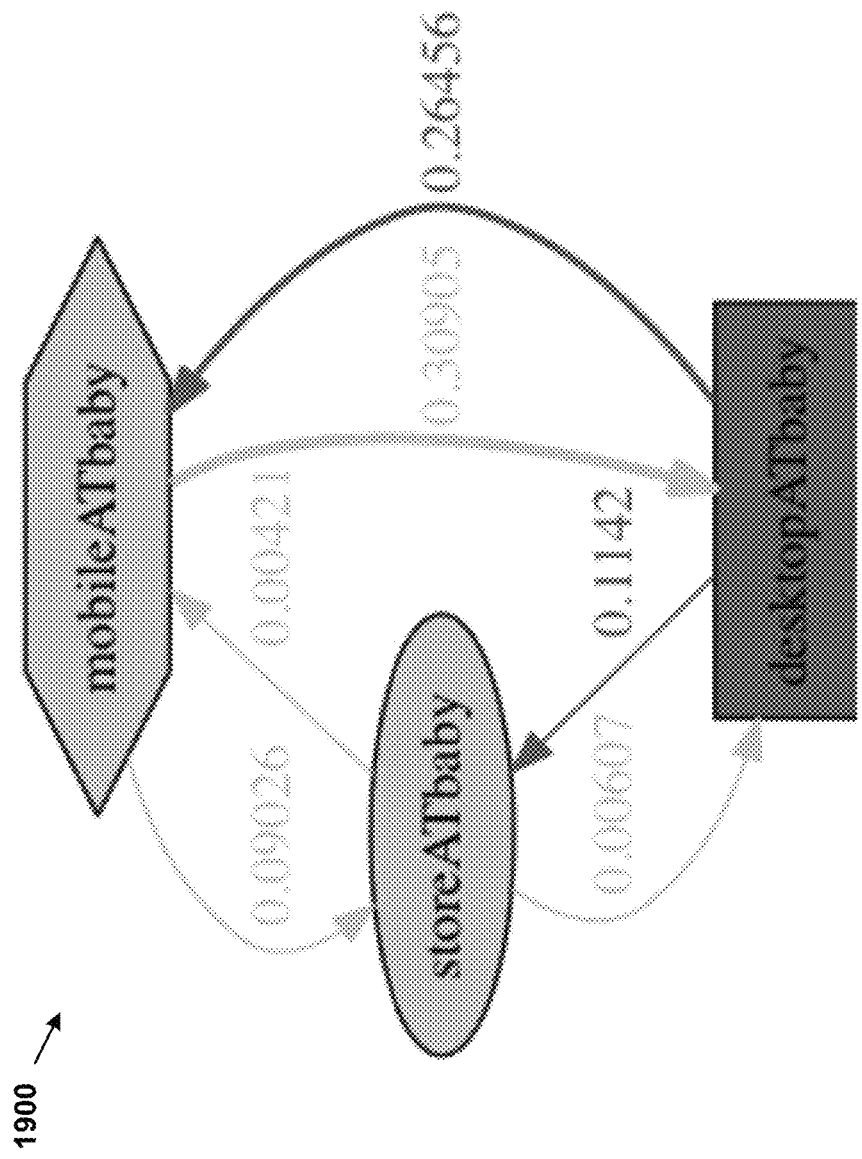
FIG. 19 illustrates a cross device transition graph for baby products.

FIGS. 17-19 illustrate cross device transition graphs by category. Substantial interaction can be seen between desktop and mobile device activity, and also between online browse and store purchase activity in the same category. All categories have some interaction between online and in-store activity, with varying degrees of strength. The interactions between desktop and mobile activity can be seen as research activity before buying in the store.

In FIG. 17, transition graph 1700 illustrates strong interactions between desktop and mobile can be seen for products in a furniture category. 25% of users that viewed furniture on the website on a mobile device also viewed furniture from a desktop computer. 18% of users who viewed furniture on a desktop computer also viewed furniture on the website using a mobile device. In this instance, there is weaker interaction between the desktop and mobile activity and in-store purchases, indicating that viewing furniture on the retailer website does not often lead to a purchase in the store. Here, only about 2% of users who viewed furniture on the retailer website with a desktop computer ultimately purchased furniture at the store and only 1.5% of users who viewed furniture on a mobile device purchased furniture at the store.

FIG. 18 shows a transition graph 1800 for grocery products sold by the retailer. Here, in contrast to the furniture category, very little interaction is seen between the desktop and mobile activity. Only about 6% of users who viewed groceries on a desktop computer later viewed groceries on a mobile device. Only about 9% of users who viewed groceries on a mobile device later viewed groceries on a desktop computer. Also in contrast to the furniture category, there is a strong interaction between the desktop and mobile devices and purchases made in the store. Almost 26% of users who viewed groceries on the retailer website on a mobile device later purchased groceries at the retail store. A strong 35% of desktop computer users viewed groceries and later purchased groceries at the store.

FIG. 19 illustrates a transition graph 1900 for baby products. There is a strong interaction between mobile use and desktop computer use, similar to the interactions of the furniture category shown in FIG. 17. About 30% of mobile users later view baby products on a desktop computer. About 26% of desktop computer users later view baby products on a mobile device. There is a moderate level of interaction between desktop and mobile browsing and later purchases made at the retail store. In particular, and as seen in FIG. 19, 9% of mobile users and 11% of desktop users later purchase baby items in the retail store.

As the examples of FIGS. 14-19 have shown, the methods and systems described can be used to determine the probability that browsing activity on two or more devices can be attributed to the same user. Attributing browsing activity from different devices to the same user can inform marketers and retailers of customer preferences and show how customers arrive at purchase decisions. Many additional applications of the present method are possible. For example, the methods can be used to personalize product recommendations or advertisements for a user browsing a particular website. Without gathering personal identifying information about customers, insights can be gained into the preferences and behaviors of customers.

Embodiments of the present invention, for example, are described above with reference to block diagrams and/or operational illustrations of methods, systems, and computer program products according to embodiments of the invention. The functions/acts noted in the blocks may occur out of the order as shown in any flowchart. For example, two blocks shown in succession may in fact be executed substantially concurrently or the blocks may sometimes be executed in the reverse order, depending upon the functionality/acts involved.

The description and illustration of one or more embodiments provided in this application are not intended to limit or restrict the scope of the invention as claimed in any way. The embodiments, examples, and details provided in this application are considered sufficient to convey possession and enable others to make and use the best mode of claimed invention. The claimed invention should not be construed as being limited to any embodiment, example, or detail provided in this application. Regardless of whether shown and described in combination or separately, the various features (both structural and methodological) are intended to be selectively included or omitted to produce an embodiment with a particular set of features. Having been provided with the description and illustration of the present application, one skilled in the art may envision variations, modifications, and alternate embodiments falling within the spirit of the broader aspects of the general inventive concept embodied in this application that do not depart from the broader scope of the claimed invention.

The invention claimed is:

1. A method of delivering personalized content to a user, the method comprising:
   generating a first cookie from browsing activity by a first device at a website;
   receiving the first cookie at a computing system, the first cookie being attributable to a specific user based on user-identifying information in the first cookie, the first cookie having first characteristics related to the browsing activity by the first device;
   generating a second cookie from browsing activity by a second device at the website;
   receiving the second cookie at the computing system, the second device being different from the first device, the second cookie being anonymous and having second characteristics related to the browsing activity by the second device;
   determining, using a device attribution engine using a random forest classifier, that second cookie is associated with activity of the specific user based on similarities found in the first and second characteristics;
   pairing the second cookie with the first cookie and building a user profile for the specific user based on the first and second characteristics; and
   delivering personalized content to the specific user based on the user profile.

2. The method of claim 1, wherein the each of the first and second devices comprises at least one of a laptop computer, a desktop computer, a smartphone, a tablet and a cellular phone.

3. The method of claim 1, wherein the browsing activity comprises one or more of clicking elements on a web browser, making selections in a computing application, viewing pages on a website, filling in forms on the website, and making a purchase on the website.

4. The method of claim 1, wherein the characteristics of the cookies comprise one or more of IP address, zip code, number of page views, items viewed in similar categories, similar items viewed, similar visit times of day, items purchased, and items put in a shopping cart.

5. The method of claim 1, wherein the random forest classifier is trained on probabilities output from a Gaussian mixture model.

6. The method of claim 1, wherein the website is a retail website.

7. A system of delivering personalized content to a user, the system comprising:
- a web server hosting a website and storing cookies recorded from the browsing activities of one or more users on one or more network-connected devices, the web server configured to cause a first cookie to be generated from browsing activity by a first device at a website and to generate a second cookie from browsing history by a second device at the website; and
- a computing device including a processor and a memory in communication with the processor, the memory storing instructions being executed by the processor and causing the processor to:
  - receive the first cookie at a computing system, the first cookie being attributable to a specific user based on user-identifying information in the first cookie, the first cookie having first characteristics related to the browsing activity by the first device;
  - receive the second cookie at the computing system, the second device being different from the first device, the second cookie being anonymous and having second characteristics related to the browsing activity by the second device;
  - determine, using a device attribution engine using a random forest classifier, that second cookie is associated with activity of the specific user based on similarities found in the first and second characteristics;
  - pair the second cookie with the first cookie and build a user profile for the specific user based on the first and second characteristics; and
  - deliver personalized content to the specific user based on the user profile.

8. The system of claim 7, wherein the classifier is trained on probabilities output from a Gaussian mixture model.

* * * * *